(12) United States Patent
Mayes et al.

(10) Patent No.: US 7,538,157 B2
(45) Date of Patent: May 26, 2009

(54) STRUCTURED BAROPLASTIC MATERIALS

(75) Inventors: Anne M. Mayes, Mustang, OK (US); Sang-Woog Ryu, Taegu (KR); Metin H. Acar, Istanbul (TR); Juan A. Gonzalez, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 543 days.

(21) Appl. No.: 11/172,371

(22) Filed: Jun. 29, 2005

(65) Prior Publication Data
US 2007/0073000 A1 Mar. 29, 2007

Related U.S. Application Data

(63) Continuation of application No. PCT/US2004/000334, filed on Jan. 7, 2004.

(60) Provisional application No. 60/438,445, filed on Jan. 7, 2003.

(51) Int. Cl.
C08L 33/04 (2006.01)

(52) U.S. Cl. .............................. 525/84; 525/85; 525/86; 525/87; 525/212; 525/218; 525/221; 525/227; 525/241; 525/244; 525/301; 523/201; 428/373

(58) Field of Classification Search .................. 525/84, 525/85, 86, 87, 212, 218, 221, 227, 241, 525/244, 309; 523/201; 428/373
See application file for complete search history.

(56) References Cited

U.S. PATENT DOCUMENTS

| | | | |
|---|---|---|---|
| 4,473,679 A | | 9/1984 | Falk et al. |
| 5,314,962 A | | 5/1994 | Otsu et al. |
| 5,322,731 A | | 6/1994 | Callahan, Jr. et al. |
| 5,399,620 A | | 3/1995 | Niessner et al. |
| 5,468,785 A | | 11/1995 | Greul et al. |
| 5,654,368 A | * | 8/1997 | Nakano et al. ............... 525/193 |
| 5,789,487 A | | 8/1998 | Matyjaszewski et al. |
| 5,807,937 A | | 9/1998 | Matyjaszewski et al. |
| 6,150,459 A | | 11/2000 | Mayes et al. |
| 6,207,749 B1 | | 3/2001 | Mayes et al. |
| 6,632,883 B2 | | 10/2003 | Mayes et al. |

FOREIGN PATENT DOCUMENTS

| | | |
|---|---|---|
| EP | 0992519 | 4/2000 |
| WO | WO 99/55751 | 11/1999 |
| WO | WO 01/60912 | 8/2001 |
| WO | WO 2004/063271 A2 | 7/2004 |

OTHER PUBLICATIONS

PCT/US04/00334, International Search Report dated Aug. 10, 2004.
PCT/US01/04879, International Search Report dated Sep. 18, 2001.
Gonzalez-Leon et al., "Low-temperature processing of 'baroplastics' by pressure-induced flow," Nature, vol. 426:424-428, Nov. 27, 2003.

* cited by examiner

Primary Examiner—Bernard Lipman
(74) Attorney, Agent, or Firm—Wolf, Greenfield & Sacks, P.C.

(57) ABSTRACT

The present invention provides a series of baroplastic materials, and systems and methods of making and using such baroplastic materials. In one aspect of the invention, polymeric particles are provided that can be used to produce baroplastic materials under certain pressures and/or below certain temperatures. In one set of embodiments, the polymeric particles include an inner "core" region and an outer "shell" region. In some cases, more than one "shell" region may be present. In another arrangement the particles can include materials, or domains, in nanoscale proximity with each other. Non-particulate materials can also be processed in accordance with the invention. In another aspect of the invention, the invention provides for polymeric particles that can be processed and/or recycled multiple times, without causing significant degradation or alteration in the physical and/or chemical properties of the polymer. In yet another aspect, the invention provides compositions able to form baroplastic materials upon the application of certain pressures, where the composition includes at least two chemically distinct materials in nanoscale proximity to each other. In still another aspect of the invention, a method of mixing two polymers upon the application of pressure is provided.

19 Claims, 7 Drawing Sheets

STRUCTURED BAROPLASTIC MATERIALS

RELATED APPLICATION

This application is a continuation of International Application No. PCT/US2004/000334, filed Jan. 7, 2004 which claims priority to U.S. Provisional Patent Application Ser. No. 60/438,445, filed Jan. 7, 2003.

FEDERALLY SPONSORED RESEARCH

This invention was made with government support under Contract Numbers N00014-02-1-0226, awarded by the Navy. The government has certain rights in the invention.

FIELD OF INVENTION

The present invention generally relates to baroplastic materials, and in particular, to systems and methods for producing and using baroplastic materials. The U.S. Government has certain rights in this invention.

BACKGROUND OF THE INVENTION

Commodity plastics are usually molded into usable shapes by techniques such as melt processing. This method has become one of the most popular and accepted methods to produce manufactured plastic products. However, one significant drawback of this processing technique is degradation to material which can be imposed by high temperatures (usually >200° C.) typically required to process polymeric materials. This can result in a reduction of the mechanical performance of the material, and can limit the number of times the material can be recycled before disposal.

A different approach has been proposed by using the pressure-induced miscibility of block copolymers in materials that have been termed "baroplastic." Baroplastic block copolymers are processable by the application of pressure at significantly reduced temperatures that can reduce the degradation imposed to the polymer during processing, extending its recycle life. International patent application serial no. PCT/US01/04879, entitled "Baroplastic Materials" describes such systems. However, the synthesis of well-defined block copolymers requires significant effort. Although block copolymers are used industrially, their synthesis at large scales remains a challenge, and the choices of monomers that can be used in block copolymer synthesis are limited.

SUMMARY OF THE INVENTION

The present invention generally relates to baroplastic materials. The subject matter of this application involves, in some cases, interrelated products, alternative solutions to a particular problem, and/or a plurality of different uses of a single system or article.

In one aspect, the invention includes a method. One method of the invention involves providing a plurality of particles, and applying pressure to the particles to form a defined structure. At least some of the particles include a first material that is a solid at a particular temperature (service temperature) and a second, entrapped material that is a fluid at the service temperature. Pressure is applied to the particles sufficient to cause at least a portion of the first material to exhibit fluidity at a temperature at which, in the absence of the pressure, the portion of the first material remains solid, and that causes mixing of at least some of the first and second material together. Pressure is released to form an article that is a composite of the particles and that has a defined structure at the service temperature.

Another method of the invention involves providing a plurality of particles, at least some of which include a first material and a second material in nanoscale proximity with each other. The first material and the second material are immiscible at ambient pressure, and at least somewhat miscible at a pressure of at least about 100 psi at a temperature at which, in the absence of the pressure, the first material and the second material are immiscible. A pressure of at least about 100 psi is applied, and pressure is released to form an article that is a composite of the particles and that has a defined structure.

Another method involves providing a plurality of particles, at some of which include a first material and a second material in nanoscale proximity with each other, wherein the first material is solid at ambient pressure and exhibits fluidity at pressures of at least about 100 psi at a temperature at which, in the absence of the pressure, the first material does not exhibit fluidity. The pressure of at least about 100 psi is applied, and pressure is released to form an article that is a composite of the particles and that has a defined structure.

Another method of the invention involves providing a plurality of particles, at least some of which include a first material and a second material defining an interfacial area therebetween of at least 20 $m^2/g$, applying pressure to the particles sufficient to cause at least a portion of the first material to exhibit fluidity at a temperature at which, in the absence of the pressure, the portion of the first material remains solid, and that causing mixing of at least some of the first material together. Pressure is released to form an article that is a composite of the particles and that has a defined structure.

Another method of the invention involves providing a plurality of particles, at least some of the particles comprising first material and a second material, at least one of the first material and second material having a molecular weight of at least about 100,000. Pressure is applied to the particles sufficient to cause at least a portion of the first material to exhibit fluidity at a temperature at which, in the absence of the pressure, the portion of the first material remains solid, and that causes mixing of at least some of the first and second material together. Pressure is released to form an article that is a composite of the particles and that has a defined structure.

Another method of the invention involves providing a solid article comprising a first material and a second material in nanoscale proximity with each other, and applying pressure to the article sufficient to cause at least a portion of the article to exhibit fluidity at a temperature at which, in the absence of the pressure, the portion of the article does not exhibit fluidity. In another set of embodiments, the method includes providing an article comprising a first material and a second material defining an interfacial area therebetween of at least about 20 $m^2/g$, and applying pressure to the article sufficient to cause at least a portion of the article to exhibit fluidity at a temperature at which, in the absence of the pressure, the portion of the article does not exhibit fluidity. In certain cases, the first material and the second material are not covalently bound to each other.

In another set of embodiments, the method includes providing a first solid polymeric article and a second solid polymeric article, and applying pressure to the first and second solid polymeric articles sufficient to allow the solid polymeric articles to fluidize and intermix.

The method, in yet another set of embodiments, includes producing a polymer from a particulate precursor having an initial polydispersity index. In one embodiment, the method includes recycling the polymer at least three times while maintaining the polydispersity index of the polymer to within about 95% of the initial polydispersity index. In another embodiment, the method includes recycling the polymer at least three times while maintaining the concentration of impurities of the polymer to within about 95% of the initial concentration of impurities. In yet another embodiment, the method includes recycling the polymer at least three times while maintaining the average molecular weight of the polymer to within about 95% of the initial average molecular weight. In another set of embodiments, the method includes processing a particular polymeric article, meeting industry standards for that article, from a polymer precursor material, and recycling the polymeric article at least three times while maintaining physical and chemical characteristics of the article sufficient to meet industry standards for the particular article.

In another aspect, the invention includes an article. In one set of embodiments, the article includes a first material and a second material in nanoscale proximity with each other. In one embodiment, the first material and the second material are immiscible at ambient pressure, and miscible at a pressure of at least about 100 psi at a temperature at which, in the absence of the pressure, the first material and the second material are immiscible. The article, in another embodiment, includes first material is solid at ambient pressure and exhibits fluidity at pressures of at least about 100 psi at a temperature at which, in the absence of the pressure, the first material does not exhibit fluidity. In another set of embodiments, the invention includes an article including a first material and a second material defining an interfacial area therebetween of at least about 20 $m^2/g$. In one embodiment, the first material and the second material are immiscible at ambient pressure, and miscible at a pressure of at least about 100 psi at a temperature at which, in the absence of the pressure, the first material and the second material are immiscible. The first material, in another embodiment, is solid at ambient pressure and exhibits fluidity at pressures of at least about 100 psi at a temperature at which, in the absence of the pressure, the first material does not exhibit fluidity. In certain cases, the first material and the second material are not covalently bound to each other.

In one set of embodiments, the article includes a baroplastic material formed from a composition having a first material and a second material defining an interfacial area therebetween of at least about 20 $m^2/g$. In another set of embodiments, the article includes a baroplastic material formed from a composition having a first material and a second material in nanoscale proximity with each other. In certain cases, the first material and the second material are not covalently bound to each other.

In another aspect, the invention is directed to a method of making any of the embodiments described herein. In yet another aspect, the invention is directed to a method of using any of the embodiments described herein.

Other advantages, novel features, and objects of the invention will become apparent from the following detailed description of non-limiting embodiments of the invention when considered in conjunction with the accompanying drawings, which are schematic and which are not intended to be drawn to scale. In the figures, each identical or nearly identical component that is illustrated in various figures typically is represented by a single numeral. For purposes of clarity, not every component is labeled in every figure, nor is every component of each embodiment of the invention shown where illustration is not necessary to allow those of ordinary skill in the art to understand the invention. In cases where the present specification and a document incorporated by reference include conflicting disclosure, the present specification shall control.

BRIEF DESCRIPTION OF THE DRAWINGS

Non-limiting embodiments of the present invention will be described by way of example with reference to the accompanying drawings in which.

DETAILED DESCRIPTION

U.S. Pat. No. 6,632,883, entitled "Baroplastic Materials," by Mayes, et al., filed Feb. 16, 2001 is incorporated herein by reference in its entirety. U.S. patent application Ser. No. 60/438,445, by Mayes, et al., filed Jan. 7, 2003 is incorporated herein by reference in its entirety.

The present invention provides a series of baroplastic materials, and systems and methods of making and using such baroplastic materials. In one aspect of the invention, polymeric particles are provided that can be used to produce baroplastic materials under certain pressures and/or below certain temperatures. In one set of embodiments, the polymeric particles include an inner "core" region and an outer "shell" region. In some cases, more than one "shell" region may be present, i.e., a multi-layered particle including materials which differ from each other and are arranged concentrically with respect to each other defines one embodiment of the invention. In another aspect of the invention, the invention provides for polymeric particles that can be processed and/or recycled multiple times, without causing significant degradation or alteration in the physical and/or chemical properties of the polymer. In yet another aspect, the invention provides compositions able to form baroplastic materials upon the application of certain pressures, where the composition includes at least two chemically distinct materials in nanoscale proximity to each other. In still another aspect of the invention, a method of mixing two polymers upon the application of pressure is provided.

The indefinite articles "a" and "an," as used herein in the specification and in the claims, unless clearly indicated to the contrary, should be understood to mean "at least one."

As used herein, "or" is understood to mean inclusively or, i.e., the inclusion of at least one, but including more than one, of a number or list of elements. Only terms clearly indicated to the contrary, such as "exclusively or" or "exactly one of," will refer to the inclusion of exactly one element of a number or list of elements.

As used herein, a "baroplastic material" is a material which, at a particular pressure, is much more readily processable than in the absence of that pressure, for example, a composition that is processed primarily by applying a pressure rather than temperature. The description herein below enables those of ordinary skill in the art to select various materials which, together, can define a baroplastic material. Typically, the baroplastic material is not processable under ambient pressures and temperatures (about 1 atm and 25° C., respectively), but becomes processable upon the application of various pressures (for example, at least about 100 psi, in some embodiments at least about 300 psi, in other embodiments at least about 1000 psi, in still other embodiments at least about 3000 psi, in still other embodiments at least about 5000 psi and in still other embodiments, at least about 7500 psi). By definition, a baroplastic material is processable, at a particular pressure, at a temperature significantly lower than would be expected given similar pressure applied to a non-baroplastic material. That is, relative to processing of a single homogeneous material (e.g., polyethylene), at which processing temperature may vary slightly change based upon applied pressure, in a baroplastic material processing temperature is significantly reduced upon application of similar pressure. As used herein, a "processable" material is a material that, under a specified temperature and/or pressure, can be molded or otherwise deformed from a first shape to a significantly different second shape, without cracking, fracturing, or otherwise "rupturing" the material. For example, a processable material may exhibit fluidity, i.e., the material may be in a liquid state or a flowable solid state (e.g., in a "rubbery" or "gelatinous" state, for example, a material above its glass transition temperature or "$T_g$" at a given pressure). In some cases, a baroplastic material may become processable upon the application of a pressure at a temperature at which, in the absence of the pressure, the baroplastic material would remain unprocessable, for example, at temperatures below the glass transition temperature of the material at 1 atm, and/or at temperatures below about 100° C., below about 75° C., below about 50° C., or at temperatures near room temperature (about 25° C.). Suitable techniques to process such processable materials can be chosen by those of ordinary skill in the art. Non-limiting examples of techniques for processing processable materials include thermoforming, compression molding, injection molding and the like.

In one aspect, the invention provides a composition able to form a baroplastic material upon the application of a pressure. In one set of embodiments, the composition includes at least two distinct materials in nanoscale proximity to each other. The distinct materials may have different chemical compositions or, in some cases, different concentrations of the same chemical species. As used herein, "nanoscale proximity" refers to a relationship between two (or more) materials positioned in distinct domains or regions such that each atom of the first material is positioned within nanometers (e.g., less than about 1 micrometer, preferably less than about 100 or 10 nanometers) of at least one atom of the second material, and similarly each atom of the second material is positioned within nanometers of at least one atom of the first material, and where the distinct domains can be separately resolved and identified on the nanoscale level (e.g., by using electron microscopy). In some cases, the domains may have a smallest dimension of at least about 1 nm, and in other cases, the domains may have a smallest dimension of at least about 2 nm, at least about 3 nm, at least about 5 nm, at least about 7 nm, at least about 10 nm, at least about 15 nm, at least about 20 nm, at least about 30 nm, at least about 40 nm, at least about 50 nm, at least about 75 nm, at least about 100 nm, at least about 200 nm, at least about 300 nm, at least about 500 nm, at least about 750 nm, or at least about 1000 nm or more in some cases. In some cases, the first material and the second material are not covalently bound to each other.

In contrast, a "blend" is a nanoscopically homogeneous mixture of two or more different materials. Typically, a blend is not resolvable under electron microscopy into two or more different domains.

Non-limiting examples of domains position, relative to each other, to achieve the benefits of the invention (which domains can be in nanoscale proximity with each other and/or can include one domain or material entrapped relative to another domain or material) include those shown in FIGS. 1A-1E. In all of the figures and description which follows, two domains of material (i.e. two different materials) that are described as being in nanoscale proximity with each other can, in another set of embodiments, be positioned relative to each other such that one is entrapped relative to the other. Where one is described as entrapped relative to the other, it is to be understood that in another set of embodiments, the same domains or materials can be positioned in nanoscale proximity with each other. In yet another set of embodiments the materials are both in nanoscale proximity with each other, while one is entrapped relative to the other.

As used herein, where a first material or domain is "entrapped" relative to a second material or domain, where the first and second materials define part or all of a particle or other unit of defined structure, the entrapped material is positioned relative to the other material such that it is not free to flow relative to the defined structure. That is, where the entrapped material is a fluid, it generally is encapsulated within another, solid material. For example, in core/shell arrangements described herein, with a fluid core and solid shell, the overall structure is defined and non-flowable under a particular set of conditions (generally ambient conditions), even though the entrapped core material would flow in the absence of the entrapping shell. These arrangements will be more fully understood from FIGS. 1A, 1D and 1E.

Figure 1A:
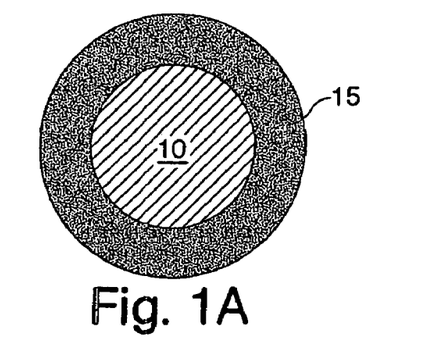
FIGS. 1A-1E illustrate schematic diagrams of several embodiments of the invention having various structures.
Figure 1B:
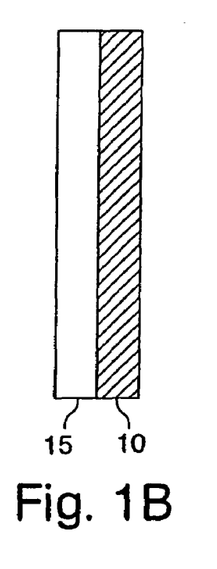
Figure 1C:
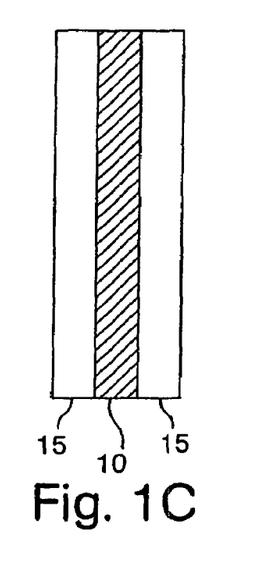
Figure 1D:
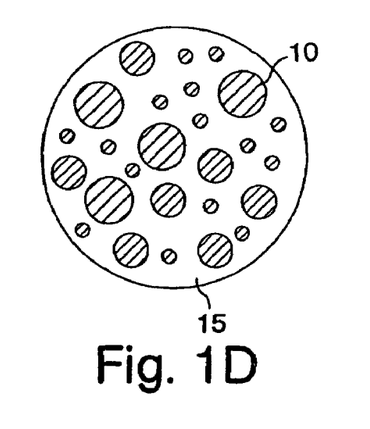
Figure 1E:
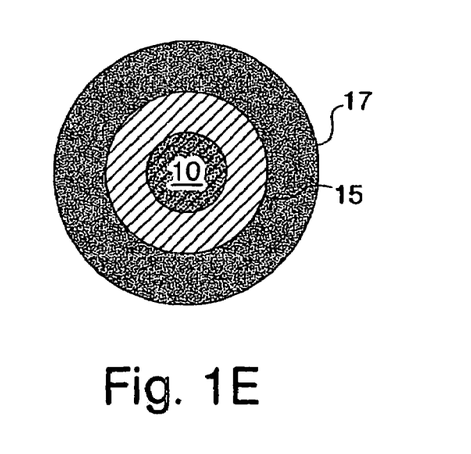

A "defined structure," as used herein, means a structure that behaves, overall, as a solid. Such structures can be solid, or can include fluid portions which are not free to flow. For example, the arrangement illustrated in FIGS. 1A, 1D, and 1E are particles each having a defined structure.

A "composite" as used herein, is given its ordinary meaning in the art, namely, something having a defined structure and made of individual materials which, previously and prior to the combination, did not define a single defined structure.

Referring again to FIGS. 1A-1E, two domains 10, 15 are positioned such that they are within nanoscale proximity with each other. Each material domain does not necessarily have to be contiguous, for example, as illustrated with domain 15 in FIG. 1C. In some cases, the distances between domains may be chosen to achieve more rapid or more efficient mixing or diffusion of material between the domains. As an example, the thickness or maximum dimension of a domain may be less than 100 nm or less than 10 nm. In some cases, the distances between the domains may be chosen such that mixing occurs at reasonable time scales, for example, such that at least 40 or 50% of the materials within two domains are intermixed within a time scale relevant for manufacturing or synthesis processes, for example, within hours, minutes, or seconds, depending on the specific application.

The composition able to form a baroplastic material may have any size or geometry, such that at least two domains of the composition are in nanoscale proximity to each other. For example, the composition may be formed as a film (such as illustrated in FIGS. 1B and 1C), particles (such as illustrated in FIGS. 1A and 1D), an irregularly-shaped article, etc. For instance, in one embodiment where the composition has the shape of a thin film, the material may include two layers (FIG. 1B), or three or more layers (FIG. 1C). As one particular example, in FIG. 1B, layer 10 may have a thickness of 10 nm or 20 nm, and layer 15 may have a thickness of 50 or 60 nm. In some cases, there may be more than two materials domains present, for example, as is shown in FIG. 1E, where domains 10, 15, and 17 may each be different materials.

In another embodiment, the composition may be formed as particles. Two or more domains of the composition may be positioned in any arrangement within the particle such that the two domains are in nanoscale proximity to each other. As a specific example, in a "core/shell" arrangement as illustrated in FIG. 1A, in an arrangement where one domain is scattered within the second domain as illustrated in FIG. 1D, etc. For example, in the core/shell arrangement of FIG. 1A, first domain 10 forms the central or "core" part of the particle, and second domain 15, distinct from first domain 10, forms an outer coating or "shell" region of the particle. In other embodiments, the particle may have multiple shells. For example, a particle containing multiple shells may be several nanometers or micrometers in diameter, such that each domain is in nanoscale proximity with other domains. As an example, in FIG. 1E, a particle may have shells 15 and 17. Shell 17 may have a different composition than shell 15 and domain 10, or shell 17 may have the same composition as domain 10. In some cases where a certain ratio of a first material and a second material is desired in a particle (e.g., a mass ratio), a particle may be designed such that the domain 10 and shell 17 comprise the first material, while shell 15 comprises the second material. The ratio of masses between the first material and the second material can then be selected as desired while simultaneously selecting a desired thickness of shell 17. Those of ordinary skill in the art will be able to determine desired mass ratios, based on the description herein. It should be noted that other methods of selecting desired mass ratios are also possible, for example, by embedding a predetermined amount of a first material in a second material, as illustrated in FIG. 1D. Combinations of these and/or other techniques are also possible. In one set of embodiments, all of the domains (materials) are free of covalent attachment to each other. That is, molecules within one domain are not covalently attached to molecules in another domain.

In certain embodiments of the invention, the particle may be chosen to have a maximum dimension on the length scale of polymer chains that form the domains of the particle. In other cases, the minimum diameter of the particle may be at least about 1 nm, and in other cases, the domains may have a smallest dimension of at least about 2 nm, at least about 3 nm, at least about 5 nm, at least about 7 nm, at least about 10 nm, at least about 15 nm, at least about 20 nm, at least about 30 nm, at least about 40 nm, at least about 50 nm, at least about 75 nm, at least about 100 nm, at least about 200 nm, at least about 300 nm, at least about 500 nm, at least about 750 nm, or at least about 1000 nm or more in some cases.

In another set of embodiments, the composition includes at least two distinct regions of material having an interfacial area therebetween of at least about 20 m$^2$/g in some cases, where the distinct domains can be separately resolved and identified on the nanoscale level (e.g., by using electron microscopy). In other cases, the interfacial area may be at least about 25 m$^2$/g; in still other cases, at least about 50 m$^2$/g; in still other cases, at least about 100 m$^2$/g; in still other cases, at least about 200 m$^2$/g; in still other cases, at least about 300 m$^2$/g; in still other cases, at least about 400 m$_2$/g; in still other cases, at least about 500 m$^2$/g; in still other cases, at least about 600 m$^2$/g; and in still other cases, at least about 750 m$^2$/g or more. The interfacial area may be determined by any suitable means, for example, through geometric considerations, or through experimental measurement in some cases (for example, by removing one region and using mercury porosimetry to determine the interfacial area). Those of ordinary skill in the art can readily form compositions including at least two distinct regions of material with interfacial areas described herein using examples provided herein, and can form baroplastic materials with these characteristics using guidance provided herein, along with at most only routine experimentation.

In one set of embodiments, the composition includes at least two distinct material domains, where a first domain has a relatively lower glass transition temperature and the second domain a relatively higher glass transition temperature. As a non-limiting example, if the composition is a particle having a core/shell arrangement as previously described, the core may have a relatively lower glass transition temperature and the shell may have a relatively higher glass transition temperature. In another arrangement, this relationship is reversed (lower glass transition shell with higher glass transition core) with an auxiliary, outer shell having a higher glass transition temperature. Additional layers can be provided as well in the spirit of the invention. In one embodiment, the glass transition temperatures of the two domains may be selected such that one of the domains has a glass transition temperature less than the service temperature, while the second domain may has a glass transition temperature higher than the service temperature. As used herein, the "service temperature" is the temperature at which the final product will be used. For example, the service temperature may be room temperature (about 25° C.), or body temperature (about 37° C., for example, for medical applications), depending on the application. In another embodiment, both domains may have glass transition temperatures higher than the final service temperature.

Thus, in certain embodiments, one domain may comprise a polymer having a $T_g$ less than room temperature (a "soft" polymer), while the second domain may comprise a polymer having a $T_g$ or $T_m$ greater than room temperature (a "hard" polymer, i.e., the polymer has negligible flow at room temperature). For example, the hard polymer may be in a glassy or a crystalline state. Soft and hard polymers may be selected or screened in some cases from known or measured $T_g$ values, as is known by those of ordinary skill in the art. As a non-limiting example, if the composition is a particle having a core/shell arrangement, the core may comprise a soft polymer, while the shell may comprise a hard polymer, or vice versa.

Guidance for selecting materials to define baroplastic materials is provided, in part, as follows. In one embodiment, the materials and the weight fractions within the two domains (designated as 1 and 2) of a composition, may be chosen to achieve a polymer that exhibits a desired miscible state using the following equation:

$$1/T_{g,mix} = w_1/T_{g,1} + w_2/T_{g,2} \qquad (1)$$

Non-limiting examples of polymer compositions suitable for use with the present invention in embodiments having two domains include: polystyrene and poly(2-ethyl hexyl acrylate), polystyrene and poly(butyl acrylate), poly(ethyl acrylate) and poly(ethyl methacrylate), or polystyrene and poly (hexyl methacrylate). In some cases, one or more of the polymer compositions used within the present invention may be a copolymer, for example, a block copolymer (for example, a block copolymer as disclosed in U.S. patent application Ser. No. 09/788,324, filed Feb. 16, 2001, incorporated herein by reference), a random copolymer, an alternating copolymer, a terpolymer, etc. For example, in one embodiment, the polymer compositions within the two regions may be polystyrene and poly(lauryl acrylate-r-methyl acrylate).

Additional non-limiting examples include: polystyrene and poly(hexyl methacrylate) polymers where $0<w_{PS}\leq 45\%$, poly(ethyl methacrylate) and poly(ethyl acrylate) polymers where $0<w_{PEMA}\leq 85\%$, poly(caprolactone) and poly(ethyl acrylate) where $0<w_{PCL}<100\%$, poly(caprolactone) and poly(ethyl methacrylate) where $0<w_{PEMA}\leq 92\%$, poly(methyl methacrylate) and poly(ethyl acrylate) copolymers where $0<w_{PMMA}\leq 65\%$, poly(ethyl methacrylate) and poly(methyl acrylate) copolymers where $0<w_{PEMA}\leq 85\%$, polystyrene and poly(vinyl ethyl ether) where $0<w_{PS}\leq 80\%$, polystyrene and poly(phenyl methyl siloxane) where $0<w_{PS}\leq 75\%$, polystyrene and poly(butyl acrylate) where $0<w_{PS}\leq 80\%$, polystyrene and poly(hexyl acrylate) where $0<w_{PS}\leq 80\%$, polystyrene and poly(2-ethyl hexyl acrylate) where $0<w_{PS}\leq 80\%$, poly(propyl methacrylate) and poly(ethyl acrylate) where $0<w_{PPMA}<100\%$, poly(butyl methacrylate) and poly(butyl acrylate) where $0<w_{PBMA}<100\%$, poly(propyl methacrylate) and poly(propyl acrylate) where $0<w_{PPMA}<100\%$, poly(propyl methacrylate) and poly(butyl acrylate) where $0<w_{PPMA}<100\%$, poly(ethyl methacrylate) and poly(propyl acrylate) where $0<w_{PEMA}\leq 90\%$, poly(ethyl methacrylate) and poly(butyl acrylate) where $0<w_{PEMA}\leq 90\%$, poly(cyclohexyl methacrylate) and poly(propyl acrylate) where $0<w_{PCHMA}\leq 80\%$, poly(cyclohexyl methacrylate) and poly(butyl acrylate) where $0<w_{PCHMA}\leq 85\%$, poly(propyl acrylate) and poly(butyl methacrylate) where $0<w_{PPA}<100\%$, and poly(propyl acrylate) and poly(caprolactone) where $0<w_{PPA}<100\%$. In the above inequalities, "w" indicates weight fraction and the subscript indicates the relevant polymer (PEMA=poly(ethyl methacrylate), PCL=poly(caprolactone), PMMA=poly(methyl methacrylate), PBMA=poly(butyl methacrylate), PPMA=poly(propyl acrylate), PCHMA=poly(cyclohexyl methacrylate), PPA=poly(propyl acrylate)).

In some embodiments, a material within a domain may have a molecular weight of at least about 50,000, and in certain cases, the molecular weight of the material may be at least about 100,000, at least about 150,000, at least about 200,000, at least about 250,000, or at least about 300,000 or more. As used herein, "molecular weight" refers to weight average molecular weight.

In some embodiments of the invention, the materials of the domains within the composition may be selected to present pressure induced-miscibility. The effect of pressure on the thermodynamic phase stability of polymers within the domains may be substantial in some cases. For instance, in certain embodiments of the invention, the materials of the domains may be immiscible under ambient conditions, but may become miscible or partially miscible under the application of pressure. As one example, two domains within a composition may become miscible under pressure and may mix such that the $T_g$ of the mixed state is an average of the $T_g$s of the original materials. The resulting $T_g$ of the mixed state, in some cases, may be lower than the processing temperature (i.e., the temperature at which the material is at, which can be as low as room temperature in some embodiments), thus allowing the material to flow and processing of the composition to occur. For example, the materials of the domains may be fully or at least partially mixed, forming a gradient between the two domains, or the mixed material may be molded or extruded into a desired shape or article. In some embodiments, additional substances may be added to the composition while the domains are in a flowable state. In some cases, the materials within the domains may be sufficiently fluidized to at least cause some mixing of the interface between the two domains.

In some cases, it may be desired to return the composition to a nonprocessable state after some processing has occurred, for example, after the material has been molded (for example, injection molded) or extruded into a desired shape. For example, if the pressure is released or the temperature is lowered below the average $T_g$ of the mixed state, at least some of the materials may revert to immiscible behavior, and can phase-separate into separate domains in some cases. In certain cases, phase separation may occur such that the high $T_g$ domain is able to solidify and become unprocessable, thus causing the composition to form a solid, unflowable state. In some embodiments, the resulting composition may comprise two or more domains that are phase-separated, for example, the two domains may interpenetrate in the resulting composition, or one domain may be present in isolated regions within the other domain, for example, as shown in FIG. 1D. Thus, in some embodiments, by relieving the applied pressure or lowering the temperature, the composition may become dimensionally stable or solid.

In another aspect, the present invention provides polymeric articles that can be processed and/or recycled multiple times (for example, at least three times, in some embodiments at least five times, in some embodiments at least ten times, in some embodiments at least 25 times, in some embodiments at least 50 times, and in some embodiments at least 100 or more times). In one set of embodiments, the articles may be recycled without causing significant degradation or alteration in the physical and/or chemical properties of the polymer. For example, the polymeric article may be remolded and/or re-formed to produce a polymeric material having nearly equivalent grade or composition as the original polymeric article. In another set of embodiments, the articles may be recycled and reused multiple times, without the application of elevated temperatures (for example, at temperatures that can result in polymer degradation), and/or without exposing the plastic to processes that can substantially alter its chemical structure (for example, in processes that result in a plastic that has a lower or reduced grade or composition, relative to the original plastic; processes that can alter the polydispersity index, the weight or number average molecular weight; and/or processes that result in an increase in the concentration of impurities within the plastic). In certain cases, the chemical structure is maintained such that the grade, composition, polydispersity index, molecular weight, or impurity concentration is maintained to within about 90%, 95%, 99%, or 99.9% of the initial grade, composition, polydispersity index, molecular weight, and/a impurity concentration after a number of recycling cycles as described above. In another set of embodiments, polymeric precursor material, for example in the form of particles, can be processed (for example, molded into a shaped article) to form an article. Following use of that article, the article can be recycled a number times (for example, at least 2, 3, 5, 10, 15, 20, 30, 50, 70, 100 or more times) without degradation of chemical or physical characteristics sufficient to remove the article from usefulness in its original form. For example, a plastic article such as a food container or electronic component housing may be molded, and then the article, along with similar articles can be recycled at least a number of times as described above and will maintain chemical and physical characteristics necessary for post-recycling use as the same article originally formed (e.g., a food container or electronic component housing, respectively). Those of ordinary skill in the art can readily ascertain physical and chemical characteristics defining requirements for polymeric articles, and can readily determine those requirements are met after recycling cycles, that is, can determine whether materials can be recycled a number of times while maintaining characteristics required (e.g., by industry standard) for the particular article, from a particular precursor material.

The articles of the invention may be prepared by any method that produces an article having two or more distinct regions. For example, if the article is a film having two or more layers, any film-producing technique may be used sequentially to produce the thin film, for example, by dipping a film in various solvents and non-solvents, or by sequentially spin-coating layers of material on a surface. As another example, if the article is a particle having a core/shell structure, a two-stage emulsion polymerization may be used to produce the particle, employing an appropriate initiator and surfactant emulsifier in a medium that serves as a non-solvent for polymer and monomer. Monomers can be chosen from any combination that can be synthesized by the same polymerization method, i.e., free radical polymerization, anionic polymerization or cationic polymerization. For example, core/shell particles incorporating styrene, methacrylates or acrylates can be synthesized by two-stage emulsion polymerization using free radical methods.

The core/shell particles can also be prepared, in some cases, by emulsification of a previously synthesized polymer, followed by emulsion polymerization of the second component or surface precipitation of the second polymer onto the core component. As one particular example, core/shell particles incorporating poly(caprolactone) may be prepared by first emulsifying poly(caprolactone) in an appropriate non-solvent with a surfactant, followed by the addition of a second monomer such as ethyl methacrylate that polymerizes on the surface of the poly(caprolactone) in the presence of a suitable free radical initiator, or in another embodiment, by addition of a second polymer, such as poly(ethyl methacrylate), and use of a suitable non-solvent to effect the precipitation of the poly(ethyl methacrylate) on the surface of the poly(caprolactone) cores. In certain embodiments, a wide variety of core/shell particle chemistries suitable for baroplastic materials may be prepared through emulsion polymerization and/or emulsification of previously synthesized polymers, using techniques known to those of ordinary skill in the art.

In some embodiments of the invention, one parameter that can be used to determine the polymer's ability to attain a phase-mixed or miscible state from a phase-separated state by the application of pressure is the pressure coefficient $dT_c/dP$. This coefficient defines a change in critical temperature, Tc, per change in pressure, P. For certain polymers exhibiting a phase separation with decreasing temperature, the application of pressure may lower the temperature of the transition. Because the transition may occur at lower temperatures upon the application of pressure (compared to the absence of pressure), the miscible state may be attained at lower temperatures, and accordingly, the polymer may be processed at lower temperatures where degradation of the polymer is reduced or negligible. For certain polymer compositions exhibiting a phase separation with increasing temperature, the application of pressure can raise the temperature of the transition. Certain polymer compositions can exhibit large pressure coefficients in which an absolute value of $dT_c/dP$ is at least about 30° C./kbar, at least about 50° C./kbar, or at least 100° C./kbar in certain cases. In one embodiment, the applied pressure can be at least about 100 psi in some cases, at least about 500 psi in other cases, at least about 1000 psi in still other cases, or at least about 5000 psi in still other cases.

In some embodiments, compositions can be selected that are phase separated at service or room temperatures and pressures, yet have large pressure coefficients that allow the domains within the composition to become miscible or partially miscible upon the application of pressure at $T_{pro}$.

Certain embodiments of the invention provide a screening method that can allow prediction of phase properties of the polymer compositions under processing conditions and under service temperatures by using parameters that are either known, calculable, or simulatable. Such parameters include, for example, but are not limited to, polymer densities, solubility parameters, thermal expansion coefficients and polymerization indices. This screening method can provide the capability to process certain polymer compositions by causing flow in the compositions under application of pressure at mild temperatures, thus reducing or eliminating degradation.

Such polymer compositions can be screened by applying a free energy model. The Flory-Huggins model for polymers calculates entropic and enthalpic contributions to a change in free energy upon mixing assuming an incompressible mixture. The present invention also accounts for a change in volume of the pure components and the mixture as a function of temperature and pressure. A model for a change in free energy upon mixing is represented as equation (3):

$$\Delta g_{mix} = RT\left[\frac{\phi_A \tilde{\rho}_A}{N_A v_A}\ln\phi_A + \frac{\phi_B \tilde{\rho}_A}{N_B v_B}\ln\phi_B\right] + \frac{\phi_A \phi_B \tilde{\rho}_A \tilde{\rho}_B}{v}(RT\chi^{FH}) + \phi_A \phi_B[(\tilde{\rho}_A - \tilde{\rho}_B)(\delta_A^2 - \delta_B^2)] \quad (3)$$

The first term in equation (3) represents the translational entropy of mixing components A and B. The second term represents primarily the enthalpic contribution upon mixing which is usually unfavorable. From an enthalpic standpoint, components generally prefer to aggregate with like components.

The third term represents the effect of compressibility and arises from the difference in the initial and final densities of the components in transforming from the phase separated to the miscible state. This change in density has the effect of concentrating or diluting self interactions. From this term, one can determine which polymer pairs will have large pressure coefficients, since its magnitude has a significant dependence on pressure.

Various methods can be used to obtain the thermodynamic parameters of equation (3), as described below.

In eq. (3), $\phi_i$ is the volume fraction of component i, Ni is the polymerization index of polymer i, v is the average molar monomer volume, $v=(v_A v_B)^{1/2}$, and $\tilde{\rho}_i$ is the reduced density of polymer i. The volume fraction $\phi_i$ can be measured or calculated by methods known to one of ordinary skill in the art. The polymerization index Ni is easily calculated from known molecular weight measurement techniques. R is the gas constant and T is the temperature at mixing.

The reduced density can be determined from equation (4):

$$\tilde{\rho}_i = \rho_i/\rho_i^* \quad (4)$$

where $\rho_i$ is the mass density and $\rho_i^*$ is the hard core density (mass density at 0 Kelvin). The mass density $\rho_i$ at different temperatures (i.e. $\rho$ (T)) are available for various polymers over certain temperature ranges (e.g. see P. A. Rodgers, J. Appl. Polym. Sci. Vol. 48, p. 1061, 1993) or they can be simulated. The hard core density, $\rho_i^*$, can be determined from PVT data by extrapolation of experimental density data to zero K for pressure P=0 (e.g. by using the Tait equation), assuming constant thermal expansion coefficients, α (melt state values).

$v_i$ can be calculated from equation (5):

$$v_i = M_{u,i}/\rho_i^* \tag{5}$$

where $M_{u,i}$ is the monomer molecular weight.

The second term in eq. (3) arises from enthalpic contributions. $\chi^{FH}$, the Flory-Huggins interaction parameter, is related to an excess exchange interaction energy Δε according to equation (6):

$$\chi^{FH} = z\left[\varepsilon_{AB} - \frac{\varepsilon_{AA} + \varepsilon_{BB}}{2}\right]/RT = z\Delta\chi\varepsilon/RT \tag{6}$$

where z is a number of nearest neighboring monomers and $\varepsilon_{ij}$ is the hard core (i.e. at zero K) attractive interaction energy (<0) between monomers i and j. Berthelot's mixing rule and the Hildebrand solubility parameter formalism can be assumed for the evaluation of $\chi^{FH}$ which equates the A-B cross interaction energy $\varepsilon_{AB}$ to the geometric average of the pure component interaction energies $\varepsilon_{AA}$ and $\varepsilon_{BB}$ as defined in equation (7):

$$\varepsilon_{AB} = \sqrt{\varepsilon_{AA}\varepsilon_{BB}} \tag{7}$$

The pure component interaction energies $\varepsilon_{ii}$ are in turn related to the experimental Hildebrand solubility parameters $\delta_i$, which is the square root of the cohesive energy density and has units of ($J^{1/2}$ cm$^{-3/2}$) as shown in equation (8):

$$\delta_i^2(T) = -\frac{1}{2}\frac{z\varepsilon_{ii}}{v_i}\tilde{\rho}_i(T) \tag{8}$$

At the hard core state (0 K), $\tilde{\rho}_i=1$, and the hard core solubility parameter is represented as the relation in equation (9):

$$\delta_i^2(0) = -\frac{1}{2}\frac{z\varepsilon_{ii}}{v_i} \tag{9}$$

According to Berthelot's mixing rule and the Hildebrand solubility parameter formalism, χ is thus related to the individual component solubility parameters as shown in equation (10):

$$\chi = \frac{v}{RT}(\delta_A(0) - \delta_B(0))^2 \tag{10}$$

The main assumptions underlying equation (3) are: (1) no volume changes upon mixing, (2) ideal entropy of mixing, (3) weak forces of the induced dipole type (dispersive interactions), and (4) Berthelot's rule for the cross interaction energy. Such a formalism implies χ is always positive.

Group contribution methods, which evaluate homopolymer properties based on the contribution of each chemical group present in the repeat unit, are typically used to determine the solubility parameter, δ. A basic assumption of such calculations is that the contribution of a given chemical group, such as a methyl ($CH_3$) group, is independent of its chemical and structural environment. Several databases of group contributions at 25° C. (298K) have been developed, using PVT (i.e. pressure-volume-temperature data) data for homopolymers or small molecule analogues. Different formalisms for the evaluation of δ can be used and can include contributions not only from dispersive van der Waals interactions, but also dipole/dipole and hydrogen bonding interactions. For example, a three component cohesive energy density can be used (D. W. Van Krevelen and P. J. Hoftyzer, Properties of Polymers. Correlation with Chemical Structure, Elsevier, N.Y., 1972) as shown in equation (11):

$$\delta^2 = \delta_d^2 + \delta_p^2 + \delta_H^2 \tag{11}$$

Alternative methods to obtain the pure component thermodynamic parameters necessary for equation (3) can involve molecular dynamics and energy minimization simulations. As an example, the density, cohesive energy density and hard core (0 K) parameters of several polymers can be determined from the commercially available software, Cerius, in combination with the force field UNIVERSAL (e.g. see Choi et al., Macromol., Vol. 31, p. 1366, 1998). These simulated densities and cohesive energy densities, obtained from hypothetical polymer chains of as little as 20 segments, were found to be in good agreement with experimentally determined values as well as those obtained from Group Contribution calculations. The advantage of such a procedure relies in its predictive nature, thereby allowing one to estimate the thermodynamic properties of polymers instead of measuring them using a PVT apparatus. This approach also provides an alternative approach to determine the hard core state parameters in comparison with the extrapolated values used here.

Another approach to obtain the thermodynamic parameters necessary for equation (3) involves built-in group contribution-like databases of commercial software packages such as Biosym. Certain modules of this software can be used to predict polymer densities as a function of temperature, solubility parameters, and thermal expansion coefficients above and below the glass transition temperature. Such methods may provide guidelines for the choice of polymer compositions useful in the present invention.

The applicability of equation (3) is expected to hold not only for polymer systems, but also some small molecule systems, including small molecule organics with weak secondary bonding interactions, or mixtures of polymers and solvents. The equation can also be modified to calculate phase diagrams for polymers using approaches known to one of ordinary skill in the art.

In one embodiment, eq. (3) can be applied as a screening method for choosing certain polymer compositions with pressure coefficients that enhance miscibility. In such cases, the third term in eq. (3), which is always negative at 0 K, takes on negative values for temperatures near 0 K.

A second necessary condition is selecting polymer components (e.g., core and shell components in the example of a particle having a core and a shell) having closely matched densities. One example for screening for matched densities is represented by a density range at 25° C. (298 K) expressed in equation (12):

$$1.06\rho_A < \rho_B < 0.94\rho_A \tag{12}$$

This condition limits the magnitude of the second and third terms of equation (3), allowing at least marginal miscibility of the polymer components.

In another aspect, the invention provides a method of forming an article. Particles of the invention (e.g., core-shell particles, or other particles, as described above) having at least a solid portion and a fluid portion may be pressurized at a pressure that is sufficient to cause at least part of the solid portion to fluidize. It should be noted that the entire solid portion does not necessarily have to fluidize. As non-limiting examples, part of the solid portion may not experience sufficient pressure to fluidize, or the solid portion may contain a second solid material therein which may not fluidize upon pressurization.

In some cases, the solid (now fluidized) portion and the originally fluid portion may at least partially mix. In certain instances, the solid (now fluidized) portion and the originally fluid portion may be miscible or at least partially miscible. When the pressure is removed, the originally solid portion, or at least a portion thereof, may revert back to a solid state from the fluidized state. Using such techniques, solid articles having a predetermined shape may be created, for example, within a mold.

As used herein, "fluid" means a material that cannot maintain its shape in isolation (e.g., without an external or defined structure) when left undisturbed for a long period of time (e.g., at least a day). A "solid" material is one that is not fluid. A fluid may be, for example, a liquid, a gas, a viscous solid, etc., and may optionally contain non-fluid species therein (for example, a liquid containing suspended solid particles therein).

The function and advantage of these and other embodiments of the present invention will be more fully understood from the examples below. The following examples are intended to illustrate the benefits of the present invention, but do not exemplify the full scope of the invention.

EXAMPLE 1

In this example, core-shell particles of polystyrene/poly(2-ethyl hexyl acrylate) were synthesized in accordance with one embodiment of the invention, using a two-stage emulsion polymerization technique.

Tetradecyltrimethylammonium bromide (99%, Aldrich, St. Louis, Mo.) was used as an emulsifier and 2,2'-azobis(2-methylpropionamidine) dihydrochloride (97%, Aldrich) was used as an initiator. The reaction was performed in deionized water at 65° C.

For the core of poly(2-ethyl hexyl acrylate), 60 g of water and 1.3 g of emulsifier, and 11 g of acetone (97%, Mallinckrodt Co., Hazelwood, Mo.) were added to a glass reactor. After purging with nitrogen for 30 min, the solution was heated to 65° C. with vigorous stirring. 9 g of 2-ethyl hexyl acrylate (98%, Aldrich) were then added to the solution and emulsified for 1 h. The first-stage microemulsion polymerization was initiated with 0.1 g of initiator and allowed to proceed for 15 h. Pre-emulsified styrene (9 g, 99%, Aldrich) using 75 g of water, 12 g of acetone, and 0.2 g of 1-dodecanethiol (98%, Aldrich) were then added continuously for 2 h. After 3 h of reaction time, core-shell particles were precipitated in methanol/water (5/1, v/v, containing trace amounts of NaCl), washed with water and methanol 3 times, and dried in vacuum for 3 days at room temperature.

Figure 2A:
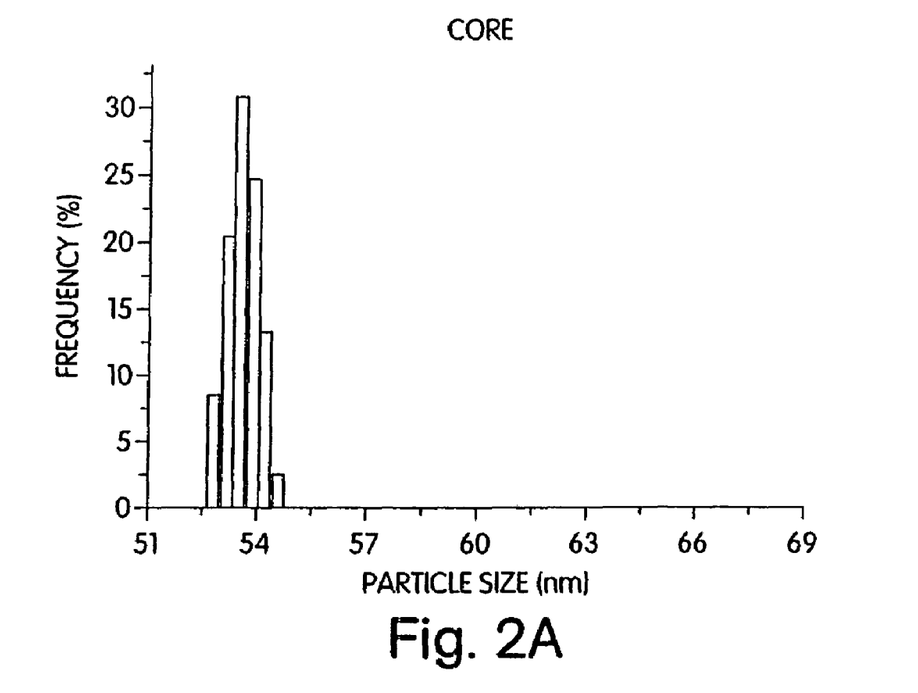
FIGS. 2A and 2B illustrate particle size distribution histograms of a core/shell embodiment of the invention, for only the core region (A) and the entire particle (B)
Figure 2B:
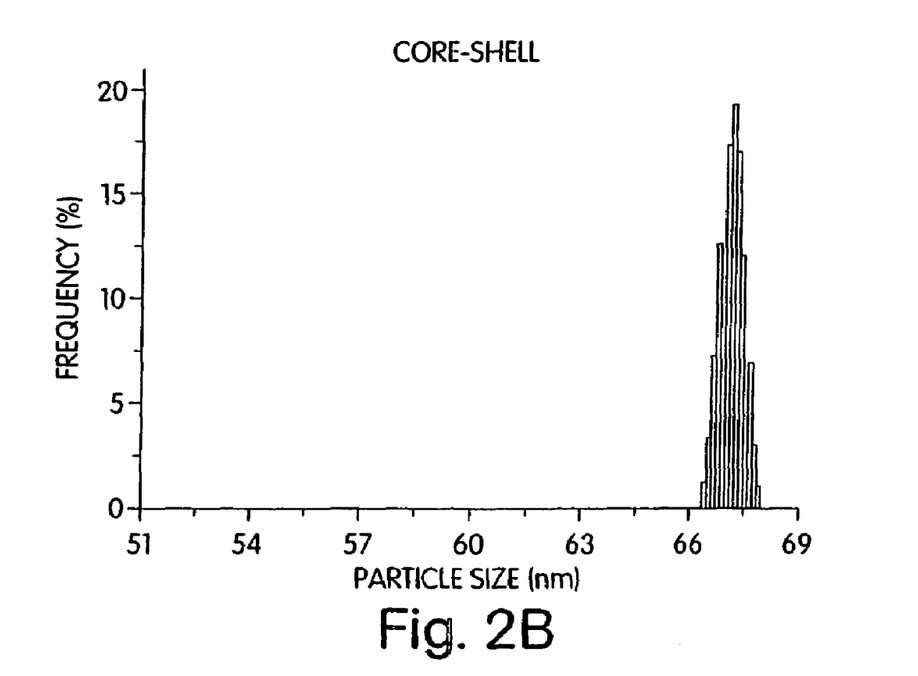
Figure 3:
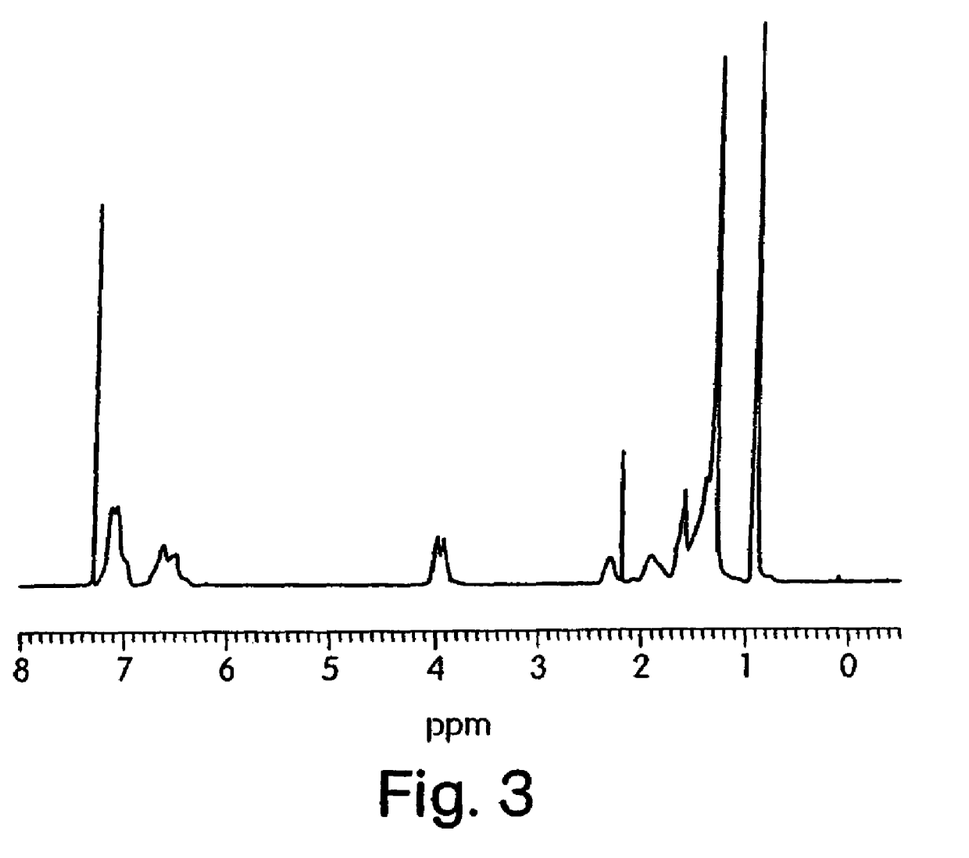
FIG. 3 illustrates a $^1$H NMR spectrum of polystyrene/poly (2-ethyl hexyl acrylate) particles of one embodiment of the invention.
Figure 4A:
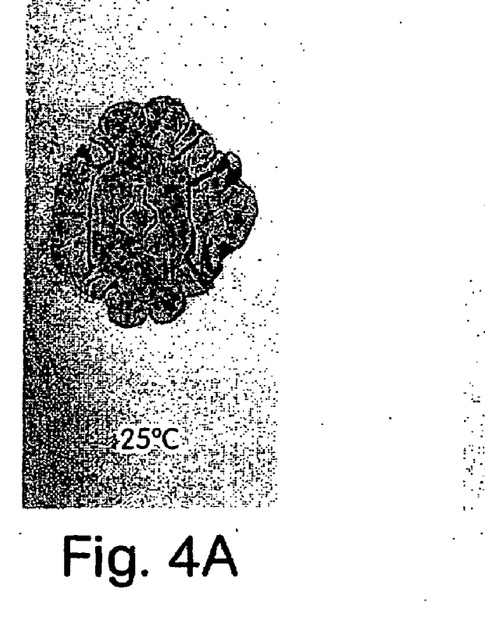
FIGS. 4A-4D illustrates various baroplastic materials processed at 5000 psi at various temperatures in one embodiment of the invention.
Figure 4B:
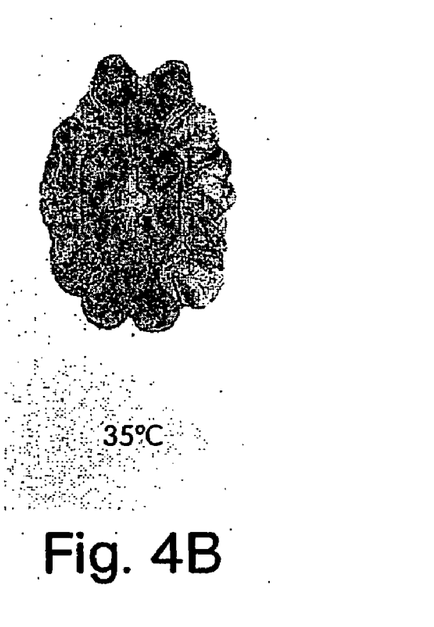
Figure 4C:
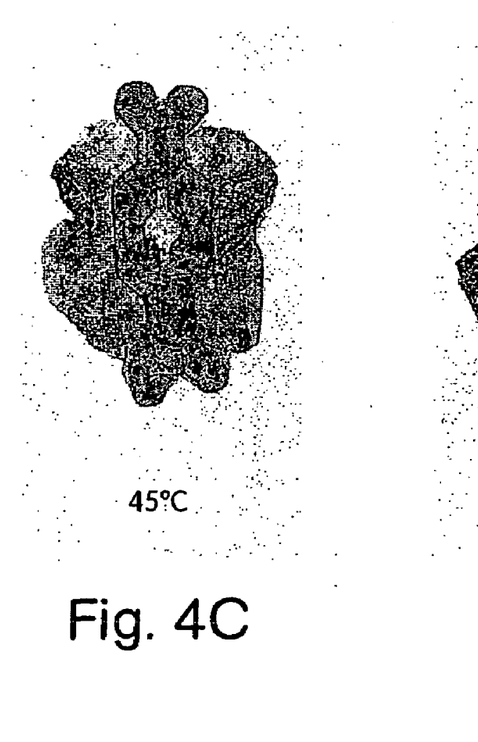
Figure 4D:
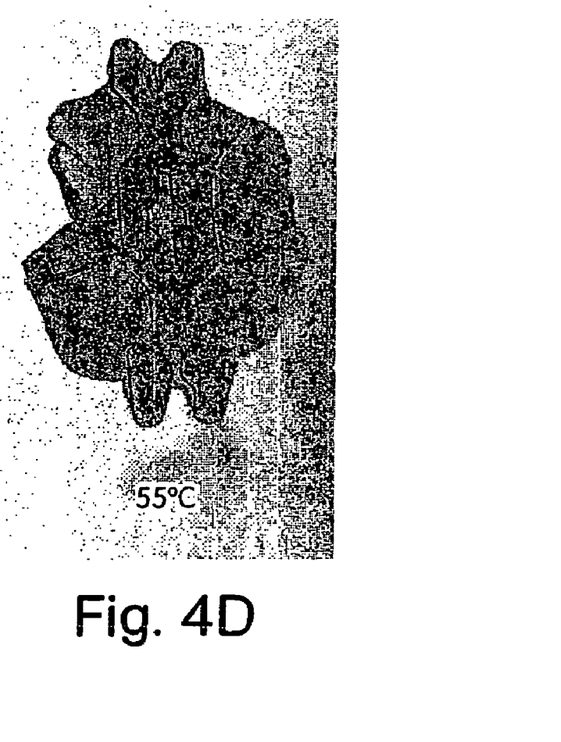

The narrow particle size distributions obtained by this method are shown in FIG. 2. The average particle diameter for the core and core-shell were 53.6 nm and 67.4 nm respectively, which shows the monotonic growth of particles after addition of styrene monomer. The composition of the resulting core-shell particles was calculated by the integral ratio of polystyrene ("PS"), and poly(2-ethyl hexyl acrylate) ("PEHA") from the 1H NMR spectrum, as shown in FIG. 3. By choosing two characteristic resonances at 6-7 ppm (styrenic aromatic) and 3.8 ppm ($OCH_2$ of 2-ethyl hexyl acrylate), the weight ratio was estimated as 0.47 and 0.53, similar to the feed ratio.

The dried material was then processed using a regular hydraulic press and a standard aluminum mold. FIG. 4 show the images of the processed material at 5000 psi for 5 minutes at temperatures of 25° C., 35° C., 45° C., and 55° C. Additionally, at room temperature (which is 75° C. below the $T_g$ of the polystyrene core), material flow was observed.

Figure 5A:
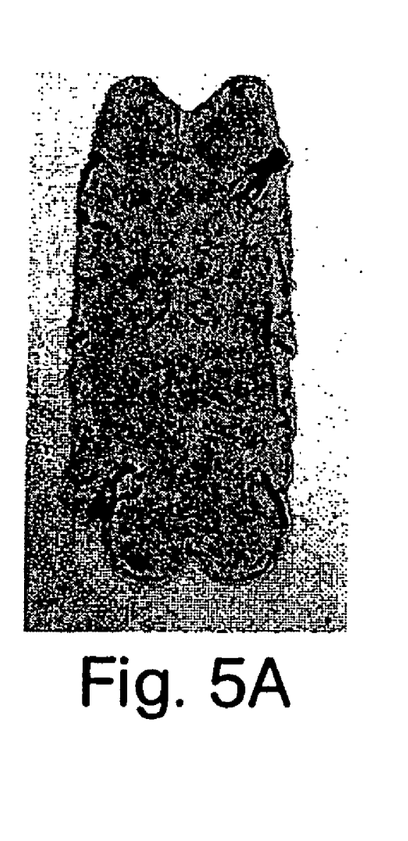
FIGS. 5A and 5B illustrates various recycled baroplastic materials, processed at 35° C. and 5000 psi.
Figure 5B:
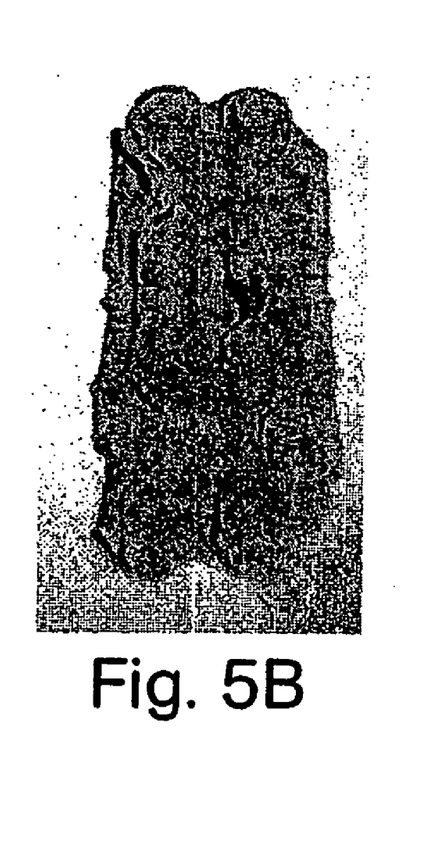

To demonstrate the recyclability of these materials as highly recyclable commodity plastics, certain materials synthesized according to the above-described method were then physically broken down and prepared again using the same protocol. FIG. 5 shows an example part formed using materials that were processed twice at 35° C. Further experiments (not shown) illustrated that the parts possessed physical and chemical properties similar to the properties of newly formed parts.

EXAMPLE 2

Figure 6A:
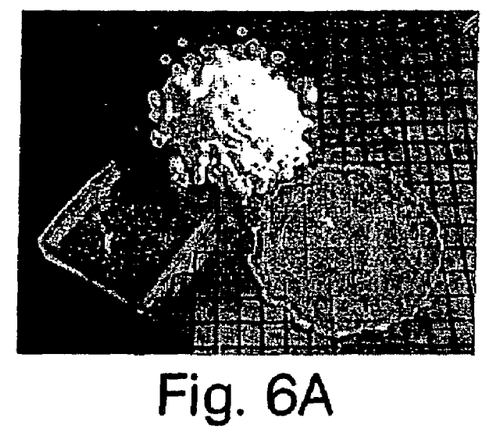
FIGS. 6A-6C illustrate molded articles of the invention, in some cases before and after molding, and in some cases recycled products.

This example illustrates the ability to process PS-b-PBA and PS-b-PEHA block copolymers at room temperature despite their high $T_g$ PS component by compression molding the freeze dried precipitates into rigid transparent objects using a standard hydraulic press and molds machined from stainless steel or aluminum. FIG. 6a shows the starting material and final products of a 38,000 g/mol PS-b-PBA block copolymer incorporating 45 wt % PBA molded at 25° C. and 34.5 MPa (5000 psi) for 5 min. The transparency of the molded objects and their accuracy of form are testimony that the copolymer flowed under applied pressure to take the shape of its container. For example, the lid of a plastic sample holder box was copied to sufficient accuracy to provide a tight seal with the original box. A 73,000 g/mol PS-b-PBA sample containing 27 wt % PBA could be processed at 80° C. at 34.5 MPa.

The premise that low temperature processing capability arises from the pressure-enhanced miscibility of the PS and PBA block components is supported by in situ small-angle neutron scattering (SANS) data taken at elevated temperatures (120° C.<T<200° C.) on a 100,000 g/mol PS-b-PBA system with 70 wt % PS (data not shown). A pressure coefficient of $dT_{DOT}/dP$~−100° C./kbar was estimated for this material, which disorders with increasing temperature.

Figure 6B:
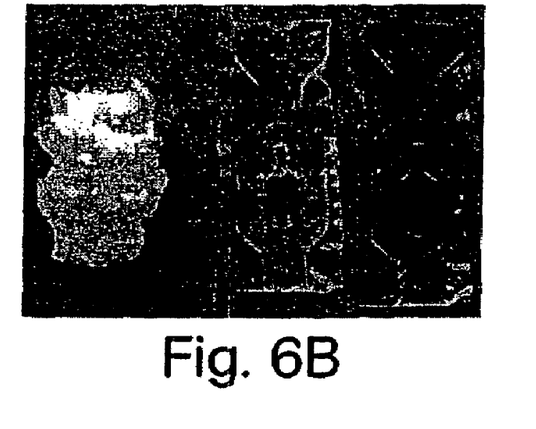

Molding studies on a 60,000 g/mol PS-b-PEHA block copolymer incorporating 52 wt % PEHA similarly revealed low temperature processing capability, and further illustrated the recycling potential of baroplastic block copolymers. FIG. 6b shows molded samples reprocessed once and ten times at 34.5 MPa and 30° C. for 5 min. Between consecutive moldings, samples were shredded into ~3 mm pieces to create the feed. Although detailed measurements have not been performed to date, the mechanical and optical properties (discounting particulate inclusions) after 10 molding operations appear comparable to the original molded specimen.

Figure 7A:
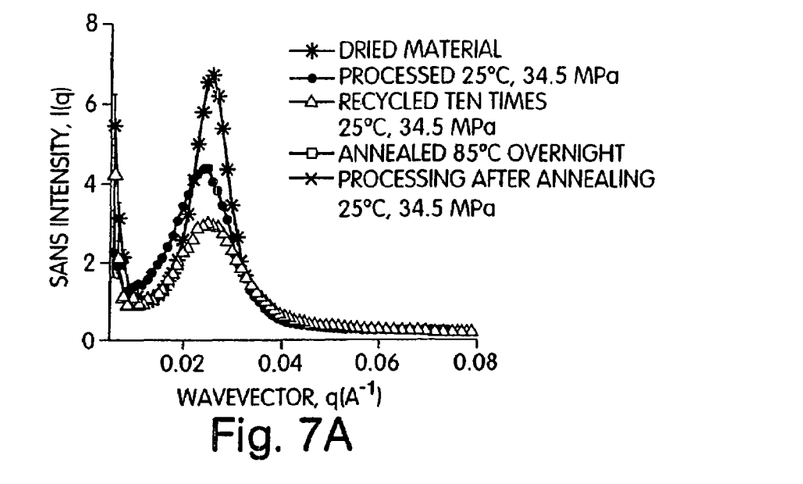
FIGS. 7A-7C show SANS data for various arrangements illustrative of the invention.

To probe how low temperature processing influences morphology, SANS was performed on samples before and after room temperature processing. FIG. 7a shows SANS data for the same PS-b-PEHA block copolymer in its initial freeze-dried state and after processing once and 10 times at 34.5 MPa and 25° C. for 5 min. The sample before molding showed a sharp reflection at wavevector (q)~0.025 Å$^{-1}$, denoting the nanoscale separation of the PS and PEHA blocks with a periodicity of 25 nm. After processing, the scattering maximum was observed to broaden and decrease in intensity, suggesting that the PS and PEHA blocks were made at least partially miscible under pressure.

Figure 7B:
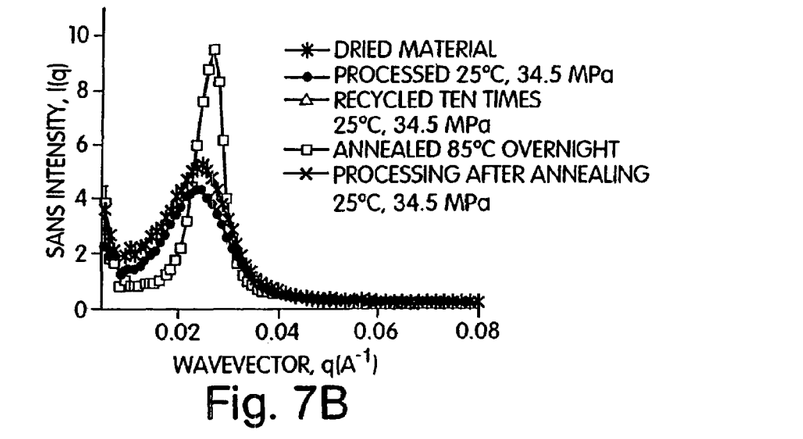

This view of the baroplastics processing mechanism is supported by experiments on a PS-b-PEHA sample processed at 34.5 MPa that was subsequently annealed at 85° C. overnight and reprocessed at 34.5 MPa. SANS data for the processed, annealed and reprocessed samples are shown in FIG. 7b. Upon annealing, the scattering maximum intensifies and narrows, indicative of enhanced block demixing and/or domain order. The corresponding DSC trace (data not shown) shows the emergence of a glass transition at ~85° C., with the glass transitions at −35 and 55° C. still present. Upon remolding, the peak in the SANS data reverted back to the shape characteristic of the processed state. The DSC trace, however, showed that this sample retains regions with a $T_g$~85° C.—60 degrees above the processing temperature. The fact that these regions are not seen in the initially processed sample, but only after the elevated temperature annealing, provided evidence for a semi-solid processing mechanism where the high $T_g$ phase is retained.

EXAMPLE 3

In this example, to create systems that could be molded as bulk plastics by pressure-induced mixing, core-shell nanoparticles were synthesized comprising a non-crosslinked, low $T_g$ core polymer and a high $T_g$ shell polymer.

Figure 6C:
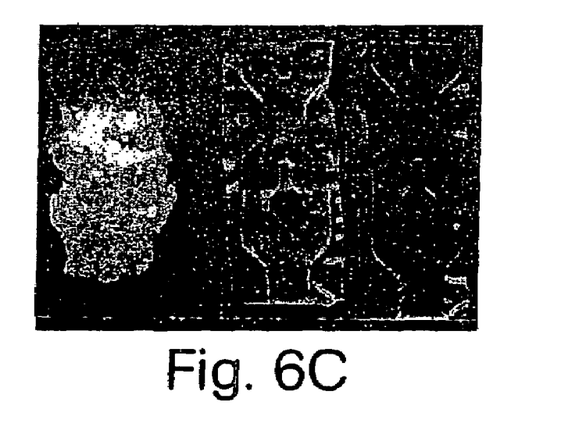

The baroplastic properties of PEHA/PS core-shell nanoparticles with 50 wt % polystyrene and average particle diameter of 67 nm are demonstrated in FIG. 6c, depicting a compression molded specimen processed at 34.5 MPa for 5 min at 25° C. from the dried state and one reprocessed 10 times following the procedure described above. Similar to the PS-b-PEHA block copolymer, the core-shell material were readily remolded at room temperature after repeated processing operations.

Figure 7C:
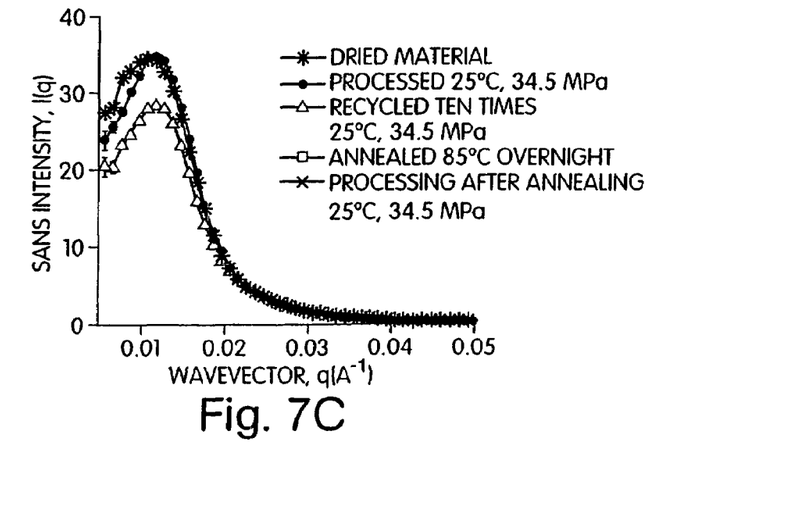

SANS data for the PEHA/PS nanoparticle system in the as-dried state, after one molding operation and after 10 recycles are shown in FIG. 7c. Several important features are notable. First, each dataset exhibited a broad maximum characteristic of the interparticle spacing, suggesting that, similar to block copolymer baroplastics, the initial sample morphology is substantially preserved during low temperature processing. Upon the initial molding, the peak position shifts to slightly larger wave vector. This behavior was found for all the core-shell systems studied and reflects the material's densification under compression. With further processing, the peak position remained constant but its amplitude diminished, suggesting enhanced mixing and a corresponding loss of contrast between PS and PEHA domains.

Although processing kinetics were not a focus of this initial investigation, a preliminary study of the effects of processing time on morphology were performed on a PBA/PS-$d_8$ core-shell nanoparticle system with 66 wt % PS-$d_8$ and an average particle diameter of 87 nm. SANS data for this system processed at 34.5 MPa and 25° C. for 1, 10 and 30 minutes showed a reduction in the peak intensity with time (not shown), indicating the PS-$d_8$ and PBA components become increasingly intermixed. DSC traces for this system processed 1 and 30 minutes again show three $T_g$'s near −40, 90 and 47° C., corresponding to the PBA, PS and interphase regions of the particles, respectively (data not shown). For this material, the mixed state $T_g$ can be estimated from the components $T_g$ and their weight fractions, w, from $1/T_{g,mix} = w_1/T_{g,1} + w_2/T_{g,2}$ to be 28° C.—effectively eliminating a processing mechanism that involves complete mixing of the two components.

In summary, the ability to mold baroplastic block copolymers and core-shell nanoparticles comprising one glassy and one rubbery component solely by applying pressure has been demonstrated. Capitalizing on pressures typically experienced in plastics manufacturing operations such as injection and compression molding, baroplastics processing may be feasible using current manufacturing equipment. The molecular mechanism underlying this phenomenon appears to involve pressure-induced partial intermixing of dissimilar nanophase domains, resulting in a semi-solid state that facilitates molding.

As a new paradigm for plastics manufacturing, semi-solid processing of baroplastics raises prospects for the low temperature molding of plastics incorporating high $T_g$, crystallizing or inorganic components, where such hard phases move within a fluidized baroplastic medium. By removing resin heating and mold cooling requirements, pressure-based processing could decrease both energy consumption and manufacturing time, while eliminating thermooxidative degradation that limits plastics recyclability.

EXAMPLE 4

This example illustrates non-limiting methods suitable for use with an embodiment of the invention.

Block copolymer synthesis. Block copolymers of PS-b-PBA and PS-b-PEHA were synthesized by atom transfer radical polymerization (ATRP). The polystyrene block was first polymerized using methyl-2-bromo-propionate as initiator and CuCl/N,N,N',N',N''-pentamethyldiethylene triamine as the catalyst complex in toluene solution at 100° C. Once the styrene polymerization reached completion, the temperature was lowered to 80° C. and acrylate monomer was added to obtain the second block. The resulting polymer solution was then passed through an alumina column to remove the catalyst and the copolymer precipitated in methanol. The recovered block copolymers were purified by repeated dissolution in dichloromethane followed by precipitation in methanol. The materials were then dried under vacuum followed by freeze-drying from benzene overnight. Compositions and molecular weights of the resulting block copolymers were determined using $^1$H NMR and gel permeation chromatography (GPC) based on polystyrene standards.

Core-shell nanoparticle synthesis. Core-shell nanoparticles of PEHA/PS and PBA/PS-$d_8$ were synthesized by a two-stage microemulsion polymerization technique. Tetradecyltrimethylammonium bromide and 2,2'-azobis(2-methylpropionamidine) dihydrochloride were used as emulsifier and initiator, respectively. Polymerization was performed under nitrogen at 65° C. Acrylate monomer was first added slowly to dionized water in the presence of emulsifier with vigorous stirring and reacted for 15 h. Pre-emulsified styrene was then added slowly to this solution and allowed to react for 3 h. The resulting core-shell particles were precipitated in methanol/water (with a trace amount of NaCl) and washed in DI water several times. The product was then vacuum dried in a presence of phosphorus pentoxide for 3 days at room temperature. Compositions and molecular weights were determined as above. Average particle sizes were determined by dynamic light scattering using a Brookhaven Instruments Co. Zeta Potential Analyzer fitted with a 676 nm laser source.

SANS. Measurements were performed at The Manuel Lujan Jr. Neutron Scattering Center at Los Alamos National Laboratory on the Low-Q diffractometer, LQD, with the following instrument configuration: wavelength=1.5-15 Å at 20 Hz, scattering angle=6-60 mrad on a 59 cm diameter detector, resulting in a q range of 0.003 to 0.5 Å$^{-1}$. Samples were ~1 cm diameter disks of variable thickness. Scattered intensities were corrected for background and thickness in the standard manner.

EXAMPLE 5

In this example, trilayer core-shell particles of polystyrene/poly(butyl acrylate)/polystyrene were synthesized by a three-stage miniemulsion polymerization technique. At first, styrene (15.4 g, 148 mmol) was emulsified with surfactant (TTAB, 2 g) in DI water (100 g) and polymerized by radical initiator (V50, 0.1 g) to form PS core particles. In the second stage, BA (8 g, 62 mmol) emulsion in DI water (60 g) was slowly added into the PS core particle solution to form a PS/PBA core-shell structure. The PS/PBA/PS tri-layered structure was then generated by addition of styrene (4.6 g, 44 mmol) emulsion in the third stage. The obtained emulsion was then poured into a methanol/water (5/1, v/v, containing trace amounts of NaCl) mixture to precipitate out the core-shell particles. To remove excess and residual emulsifier, the obtained powders were washed with water several times and dried in a vacuum oven for 3 days at room temperature in the presence of phosphorus pentoxide and final conversions were determined gravimetrically. The final product contained 68 wt % PS, with a PS core of 52 nm diameter, a PBA inner shell 60 nm thick, and an outer PS shell 63 nm thick.

The dried trilayer PS/PBA/PS core-shell material was processed into molded dogbone-shaped objects using a regular hydraulic press and a machined aluminum mold. Samples were processed at 25° C. under a pressure of 5000 psi for 5 minutes, then shredded and reprocessed under similar conditions up to 5 times. Young's modulus for the initial and reprocessed samples was above 100 MPa.

While several embodiments of the invention have been described and illustrated herein, those of ordinary skill in the art will readily envision a variety of other means and structures for performing the functions and/or obtaining the results or advantages described herein, and each of such variations or modifications is deemed to be within the scope of the present invention. More generally, those skilled in the art would readily appreciate that all parameters, dimensions, materials, and configurations described herein are meant to be exemplary and that actual parameters, dimensions, materials, and configurations will depend upon specific applications for which the teachings of the present invention are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described. The present invention is directed to each individual feature, system, material and/or method described herein. In addition, any combination of two or more such features, systems, materials and/or methods, if such features, systems, materials and/or methods are not mutually inconsistent, is included within the scope of the present invention.

All definitions, as defined and used herein, should be understood to control over dictionary definitions, definitions in documents incorporated by reference, and/or ordinary meanings of the defined terms.

It should also be understood that, unless clearly indicated to the contrary, in any methods claimed herein that include more than one act, the order of the acts of the method is not necessarily limited to the order in which the acts of the method are recited.

In the claims (as well as in the specification above), all transitional phrases such as "comprising," "including," "carrying," "having," "containing," "involving," and the like are to be understood to be open-ended, i.e. to mean including but not limited to. Only the transitional phrases "consisting of" and "consisting essentially of" shall be closed or semi-closed transitional phrases, respectively, as set forth in the United States Patent Office Manual of Patent Examining Procedures, section 2111.03.

What is claimed is:

1. A method, comprising:
providing a plurality of particles, at least some of the particles comprising a first material that is solid at a service temperature and a second, entrapped material that is fluid at the service temperature, wherein the first material and the second, entrapped material are in nanoscale proximity such that each atom of the first material is positioned within less than about 1 micrometer of at least one atom of the second material;
applying pressure to the particles sufficient to cause at least a portion of the first material to exhibit fluidity at a temperature at which, in the absence of the pressure, the portion of the first material remains solid, and that causes mixing of at least some of the first and second material together;
releasing the pressure to form an article that is a composite of the particles and that has a defined structure at the service temperature.

2. The method of claim 1, wherein the service temperature is 25 degrees C.

3. The method of claim 1, wherein the service temperature is 37 degrees C.

4. The method of claim 1, wherein the first material and the second material are not covalently bound to each other.

5. The method of claim 1, wherein the pressure is at least about 100 psi.

6. The method of claim 1, wherein the pressure is at least about 1000 psi.

7. The method of claim 1, wherein the first material and the second material are at least somewhat miscible at a pressure of at least about 100 psi.

8. The method of claim 1, wherein the particles have a maximum cross-sectional dimension of less than about 100 um.

9. The method of claim 1, wherein the particles includes a core region comprising the second material and a shell region comprising the first material.

10. The method of claim 9, wherein the core region has a glass transition temperature less than about 25 degrees C.

11. The method of claim 9, wherein the shell region has a glass transition temperature of at least about 25 degrees C.

12. The method of claim 1, wherein the first material comprises a first polymer and the second material comprises a second polymer.

13. The method of claim 12, wherein the first polymer and the second polymer are selected from the following respective pairs: polystyrene and poly(2-ethyl hexyl acrylate), polystyrene and poly(butyl acrylate), poly(ethyl acrylate) and poly(ethyl methacrylate), polystyrene and poly(hexyl methacrylate), polystyrene and poly(lauryl acrylate-r-methyl acrylate) poly(ethyl methacrylate) and poly(ethyl acrylate), poly(caprolactone) and poly(ethyl acrylate), poly(caprolactone) and poly(ethyl methacrylate), poly(methyl methacrylate) and poly(ethyl acrylate), poly(ethyl methacrylate) and poly(methyl acrylate), polystyrene and poly(vinyl ethyl ether), polystyrene and poly(phenyl methyl siloxane), polystyrene and poly(butyl acrylate), polystyrene and poly(hexyl acrylate), polystyrene and poly(2-ethyl hexyl acrylate), poly(propyl methacrylate) and poly(ethyl acrylate), poly(butyl methacrylate) and poly(butyl acrylate), poly(propyl methacrylate) and poly(propyl acrylate), poly(propyl methacrylate) and poly(butyl acrylate), poly(ethyl methacrylate) and poly(propyl acrylate), poly(ethyl methacrylate) and poly(butyl acrylate), poly(cyclohexyl methacrylate) and poly(propyl acrylate), poly(cyclohexyl methacrylate) and poly(butyl acrylate), poly(propyl acrylate) and poly(butyl methacrylate), and poly(propyl acrylate) and poly(caprolactone).

14. The method of claim 1, wherein the step of applying pressure to the particles comprises placing the particles in a mold.

15. The method of claim 1, wherein the step of applying pressure to the particles comprises placing the particles in an extruder.

16. A method of claim 1, wherein the first material and the second material are in nanoscale proximity with each other, and the first material exhibits fluidity at pressures of at least about 100 psi.

17. An article formed by the method of claim 1.

18. A method of claim 1, wherein the first material and the second material have an interfacial area therebetween of at least about 20 $m^2/g$.

19. The method of claim 1, wherein at least one of the first material and the second material have a molecular weight of at least about 100,000.

* * * * *